(12) United States Patent
Brown et al.

(10) Patent No.: US 10,392,134 B2
(45) Date of Patent: Aug. 27, 2019

(54) PROPULSION AND GAS-MOVING SYSTEMS USING TRAVELLING-WAVE GAS DIELECTROPHORESIS

(71) Applicant: Trustees of Boston University, Boston, MA (US)

(72) Inventors: Keith Andrew Brown, Newton, MA (US); Brian Michael Walsh, Cambridge, MA (US); Alexander Reever Stooss, Troy, MI (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 15/942,796

(22) Filed: Apr. 2, 2018

(65) Prior Publication Data

US 2018/0281993 A1    Oct. 4, 2018

Related U.S. Application Data

(60) Provisional application No. 62/479,477, filed on Mar. 31, 2017.

(51) Int. Cl.
*B64G 1/40* (2006.01)
*B03C 5/02* (2006.01)

(52) U.S. Cl.
CPC .............. *B64G 1/409* (2013.01); *B03C 5/028* (2013.01)

(58) Field of Classification Search
CPC .... B03C 5/00–028; B64G 1/42; B64G 1/421; B64G 1/409
See application file for complete search history.

(56) References Cited

U.S. PATENT DOCUMENTS

| | | |
|---|---|---|
| 2,949,550 A | 8/1960 | Townsend Brown |
| 7,380,756 B1 | 6/2008 | Enloe et al. |
| 9,242,747 B1 | 1/2016 | Burton et al. |
| 9,329,007 B2 | 5/2016 | Krauss et al. |

OTHER PUBLICATIONS

Wang et al., "A unified theory of dielectrophoresis and travelling wave dielectrophoresis," 1994 J. Phys. D:Appl Phys. 27, pp. 1571-1574 (Year: 1994).*

(Continued)

*Primary Examiner* — Alexander S Noguerola
(74) *Attorney, Agent, or Firm* — BainwoodHuang (57) ABSTRACT

A propulsion system for an orbiting vehicle such as a low-Earth orbit (LEO) satellite includes a set of surfaces over which a gas passes during orbital flight, and a plurality of electrodes on the surfaces. The electrodes are configured to create an electric field having a spatial field pattern in response to field signals, experienced by passing gas molecules as an oscillating field having a frequency on the order of a polarization-resonance frequency of the molecules to impart a propulsive traveling-wave dielectrophoretic force to the passing molecules. The electrodes extend over sufficient area to impart sufficient traveling-wave dielectrophoretic force to the gas to overcome aerodynamic drag and thereby sustain orbital flight of the vehicle. A power source applies the field signals to the electrodes, providing sufficient power to overcome power lost to aerodynamic drag and thereby sustain orbital flight.

10 Claims, 8 Drawing Sheets

(56) References Cited

OTHER PUBLICATIONS

Huang et al. "Electrokinetic behavior of colloidal particles in travelling electric fields: studies using yeast cells," J. Phys. D. Appl. Phys. 26 (1983) 1528-1535 (Year: 1983).*

Hagedorn et al., "Traveling-wave dielectrophoresis of microparticles," Electrophoresis 1992, 11, 49-54 (Year: 1983).*

Calle et al., "Dust Particle Removal by Electrostatic and Dielectrophoretic Forces with Applications to NASA Exploration Missions," Proc. ESA Annual Meeting on Electrostatics 2008, Paper 01 (Year: 2008).*

Calle et al., "Electrodynamic Dust Shields on the International Space Station: Exposure to the space environment," Journal of Electrostatics 71 (2013) 257-259 (Year: 2013).*

Gardner et al., "Space shuttle measurements: clouds of atmospheric metal atoms and ions," Proc. SPIE 4150, Optical Remote Sensing of the Atmosphere and Clouds (Year: 2001).*

Li et al., "The mechanism study of dust removal with transparent interdigitiated electrodes," Integrated Ferroelectrics 2016, vol. 171, 1-7 (Year: 2016).*

QiXia et al., "Mechanism of dust removal by a standing wave electric curtain," Science China—Physics, Mechanics & Astronomy, Jun. 2012 vol. 55 No. 6: 1018-1025 (Year: 2012).*

Atten et al., Study of Dust Removal by Standing-Wave Electric Curtain for Application to Solar Cells on Mars, IEEE Transactions on Industry Application, vol. 45, No. 1, Jan./ Feb. 2009 (Year: 2009).*

Neculae et al., "Filtration of Flue Gas in Microfluidic Devices using Dielectrophoresis," Rom. Journ. Phys., vol. 61, Nos. 5-6, p. 957-969, Bucharest, 2016.*

Makarov et al., Journal of Quantitative Spectroscopy & Radiative Transfer 112 (2011) 1420-1428 (Year: 2011).*

Tretyakov et al., Review of Scientific Instruments 80, 093106 (2009) (Year: 2009).*

Pages 1067 to 1069 of Raymond Serway Physics for Scientists and Engineers, 2004, 6th ed. Thomson Brooks/Cole (Year: 2004).*

Do Physics Online article entitled Hertz's Experiments downloaded Oct. 16, 2018 from http://www.physics.usyd.edu.au/teach_res/hsp/u7/t7_21.pdf (Year: 2018).*

Hubert et al., "Effect of hot oxygen on thermospheric O I UV airglow," Journal of Geophysical Research, vol. 194, No. A8, pp. 17,139-17,143, Aug. 1, 1999 (Year: 1999).*

Plane et al.,, "The Mesosphere and Metals: Chemistry and Changes," Chem. Rev. 2015, 115, 4497-4541 (Year: 2015).*

Cheng, Fang, et al. "A Continuous High-Throughput Bioparticle Sorter Based on 3D Traveling-Wave Dielectrophoresis." Lab Chip, Sep. 2009, pp. 3193-3201; p. 3193, abstract; p. 3194, second column, second paragraph; p. 3195; second column; p. 3196, first column, Microfabrication paragraph and System Configuration section; p. 3198, first column, first paragraph, figure 3.

* cited by examiner

PROPULSION AND GAS-MOVING SYSTEMS USING TRAVELLING-WAVE GAS DIELECTROPHORESIS

BACKGROUND

This application relates to propulsion systems for vehicles such as low-Earth-orbit (LEO) satellites. It also relates to terrestrial gas-moving systems such as gas separators.

SUMMARY

The lifetime of satellites in low earth orbit is limited by the need to continually recover kinetic energy lost to atmospheric drag. This limitation is increasingly stifling at altitudes below 200 km where, if left unchecked, drag can cause spacecraft to fall out of orbit very quickly (e.g., on the order of days.) It would be transformative if satellites could be stationed permanently at low altitudes on the order of 125 km. Today the vast majority of satellites in low earth orbit (LEO) have altitudes of about 800 km, whereas being lower could speed up communications, enable better observation of terrestrial events, and reduce cost of entering orbit. However, there is currently no way to sustain orbit of spacecraft between 125 and 200 km. For current satellites, engines of various kinds are routinely used to maneuver or station-keep in low earth orbit. However, these all require propellants that are consumed. Existing technologies such as combustible fuels, compressed gas, or electrostatic thrusters all require fuel to be consumed, which inherently limits lifetime and thus increases the costs of missions.

In one aspect, a propellant-free propulsion system is described that allows for maintaining orbits at altitudes between 125 and 200 km indefinitely. This novel propulsion system is based upon dielectrophoresis (DEP), or the force on neutral materials in non-uniform electric fields. In particular, the disclosed system transforms what is considered a weak force into a scalable propulsion system by utilizing large parallel electrode arrays that collectively exert significant forces on ambient gas molecules. A non-restorative variant of DEP known as traveling-wave DEP (twDEP) is used to generate a force that is larger than the drag on a spacecraft at any altitude. The disclosed system, which is referred to as "Dielectrophoresis of Atmosphere Propulsion" (DAP) drive, can address pressing needs for sustaining and maneuvering spacecraft in the near earth environment with effectively indefinite mission lifetimes.

The disclosed technique offers a novel solution with significant advantages over current techniques. The DAP drive obtains force through pulling on ambient particles in the space environment. This means no carried fuel is required, which can provide valuable advantages. First, this removes the limitation or risk of ever running out of fuel, which enables a longer mission lifetime and reduces the cost of replacing spacecraft. Second, with a propellant-free technique, there is no risk of contamination from propulsion exhaust onto sensitive electronics or detectors on the outside of the spacecraft. A third major advantage is that the DAP drive is highly scalable, both in terms of different altitudes and different size drives. Not only can drive components be efficiently mass produced using existing infrastructure, a unique feature of the DAP drive is that the force generated by a single device is proportional to the density of the atmosphere. Thus, if a DAP drive can exceed the drag force at one altitude, it will do so at all altitudes. These features collectively enable tremendous opportunities for station keeping, prolonging lifetimes of low altitude missions, and even enabling extremely low altitude missions that cannot be supported through other current techniques.

In another aspect, a terrestrial gas-moving apparatus is disclosed that employs traveling-wave DEP through adiabatic compression of ambient gas. This technique can have application to gas separation, for example.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
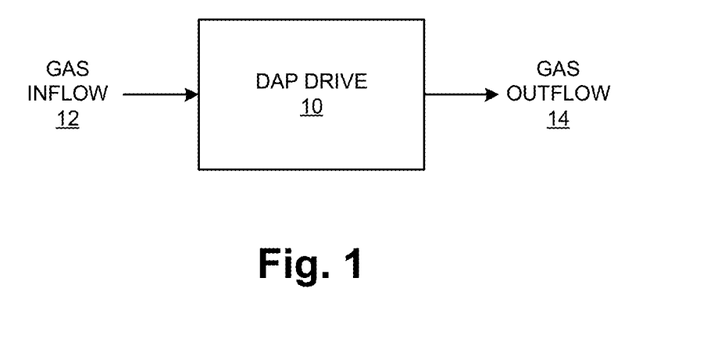
FIG. 1 is a block diagram of a system employing dielectrophoresis of atmosphere propulsion (DAP)

FIG. 1 is a generalized block diagram of a system employing traveling-wave dielectrophoresis, referred to herein as "twDEP", for generating mechanical force useful in the system. Generally, the system includes an electromechanical subsystem referred to as a "dielectrophoresis of atmosphere propulsion" or DAP drive 10, having an internal flow path for passage of a gas from a gas inflow 12 to a gas outflow 14. As mentioned, in one application the DAP drive 10 is part of vehicle such as a satellite used in low-Earth orbit (LEO), and the gas is the ambient atmosphere. In another application, the DAP drive 10 is part of a gas separator used to recover one or more constituents (appearing at outflow 14) of a multiple-constituent gas (provided at the inflow 12).

The operating principle of the DAP drive 10 is traveling-wave dielectrophoresis (twDEP), a facet of a more general effect known as dielectrophoresis (DEP) in which neutral particles move in response to non-uniform electric fields. In current applications the DEP force has been used for tasks such as trapping nanoparticles, interrogating single biological cells, separating populations of particles in solution, and even pumping fluid. Fundamentally, DEP is the result of a neutral particle becoming polarized in an electric field, and the induced dipole experiencing a force pulling it toward regions of high field. This quasi-static picture of DEP does not readily suggest an application to propulsion, as the energy stored in a particle is proportional to the local field squared, indicating that DEP is conservative and therefore unable to do net work on objects. However, this picture neglects that it takes the dipole some finite time $\tau$ to become polarized in response to the electric field. Importantly, if the field is oscillating at a frequency on the order of $1/\tau$, the induced dipole will be out of phase with the applied field. The phase lag between the dipole and the local field means that spatial variations of the phase φ of the field will result in twDEP. twDEP is non-conservative, enabling it to serve as a foundation for propulsion.

In order for twDEP to provide a meaningful amount of net force, there needs to be a non-zero imaginary polarizability. This can occur in different ways in different settings. A first case would apply in a satellite application, in which the gas moves with an extremely large velocity in one direction. DEP on gases in this picture can be understood by treating the gas molecules as individual particles. Thus, in order to find an imaginary component of the polarizability, the gas particle itself must have a dielectric resonance. A second case involves a gas at a high density with no net motion, as would be the case in a terrestrial environment at standard temperature and pressure. In this setting, adiabatic changes in local density can provide the imaginary polarizability needed to generate net thrust.

Thus for the first case, a propulsion system for an orbiting vehicle such as a low-Earth orbit (LEO) satellite is described. The propulsion system includes a set of surfaces over which a gas passes during orbital flight of the vehicle, and a plurality of electrodes on the surfaces. The electrodes are configured to create an electric field having a predetermined spatial field pattern in response to field signals applied thereto, the spatial field pattern being experienced by passing molecules of the gas as an oscillating field having a frequency on the order of a polarization-resonance frequency of the molecules to impart a propulsive traveling-wave dielectrophoretic force to the passing molecules. The electrodes extend over sufficient area to impart sufficient traveling-wave dielectrophoretic force to the gas to overcome aerodynamic drag and thereby sustain orbital flight of the vehicle. A power source applies the field signals to the electrodes, providing sufficient power to overcome power lost to aerodynamic drag and thereby sustain orbital flight of the vehicle.

For the second case, a gas-moving apparatus is described that includes a set of surfaces over which a gas passes during operation; a plurality of electrodes on the surfaces, and an AC power source. The electrodes are arranged at a predetermined spatial pitch corresponding to a predetermined frequency at a predetermined traveling-wave velocity, the predetermined frequency being substantially a dielectrophoretic gas-compression frequency of molecules of the gas, and the electrodes create an AC field in response to AC field signals applied thereto. The AC power source is configured and operative to generate the AC field signals to establish the AC field with the predetermined frequency and predetermined traveling-wave velocity to impart a propulsive traveling-wave dielectrophoretic force to the molecules of the gas over the surfaces during operation.

More specific description for each of the above mechanisms is given below.

Figure 2:
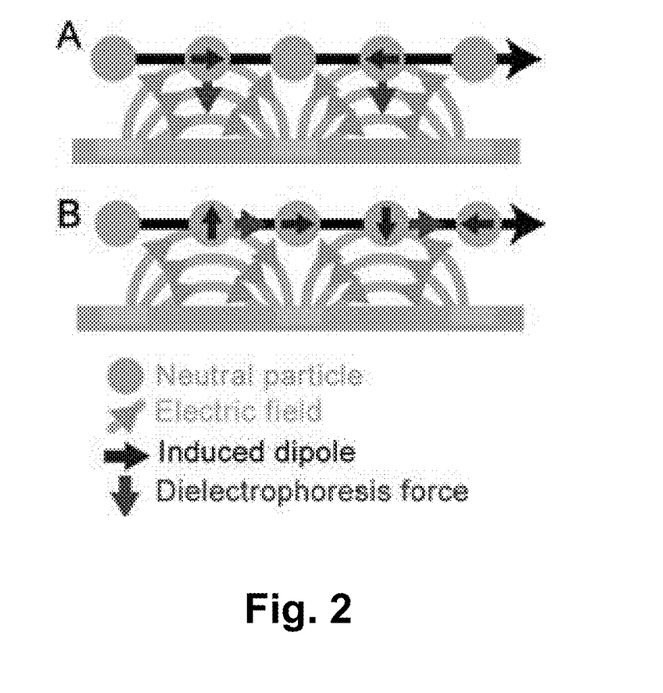
FIG. 2 is a schematic depiction of traveling-wave dielectrophoresis.

BACKGROUND THEORY twDEP is based on the interactions between polarizable particles and electric fields. With reference to FIG. 2, certain theoretical underpinnings are presented.

In a simple case, the force F on an electric dipole p in a non-uniform but static (non-time-varying) electric field E is given by, $$\vec{F} = (\vec{p} \cdot \vec{\nabla})\vec{E} \tag{1}$$

For linearly polarizable materials, a polarizability α is defined using the relationship, $$\vec{p} = \alpha \vec{E}. \tag{2}$$

Equations (1) and (2) can be combined to produce an equation of DEP, $$\vec{F} = \frac{1}{2}\alpha\vec{\nabla}E^2, \tag{3}$$

which is valid in quasi-static cases. This is illustrated in FIG. 2, part A. However, this force is conservative, as particles receive an equal and opposite force leaving the high field region as they experience entering the region. Thus, DEP is not useful for propulsion in this form.

As mentioned above, this problem is avoided by establishing circumstances in which the quasi-static condition is not met. Rather than the instantaneous response function of Equation (2), the time-dependent definition of the dipole is, $$\vec{p}(t) = \int_{-\infty}^{t} \alpha(t-t')\vec{E}(t')dt', \tag{4}$$

where the polarizability response function α(t) is the Fourier transform of the complex frequency dependent polarizability α(f). Equation (4) is a suitable governing equation for p(t) in the context of simulation and can be used together with Equation (1) to compute the time-varying force on a polarizable particle in a non-uniform and dynamic (time-varying) electric field. To estimate the magnitude of this effect, a simple case is considered of a polarizable particle moving at a velocity v through an x-directed electric field with periodicity L given by, $$E_x(x) = E_0 \sin(2\pi x/L). \tag{5}$$

Because the particle is moving in a steady field, it will experience a periodic field that oscillates with frequency f=v/L. This condition gives rise to the following expression for twDEP on a particle, $$F_{twDEP} \approx \frac{\pi \alpha'' E_0^2}{L}. \tag{6}$$

where α" is the imaginary component of the particle polarizability at f (FIG. 2, part B). In order to obtain the total force on all gas molecules in the vicinity of electrodes, Equation 6 is integrated in all space, acknowledging that in the vicinity of an electrode array, the field decays with distance away from the electrodes, which is defined to be the z-direction, $$F_{DAP} \approx nA_{DAP} \int \frac{\pi \alpha'' E^2(z)}{L} dz. \tag{7}$$

Here, $A_{DAP}$ is the total area of the electrode array and n is the number density of DEP-active molecules. Because the field from arrays of interdigitated electrodes falls off exponentially with distance from the array with a characteristic length given by the electrode spacing divided by π, Equation (7) can be simplified to find an approximate expression for the pressure (force per area electrode array) of a DAP drive, $$p_{DAP} \approx -n\alpha'' E_0^2. \tag{8}$$

It is important to note that Equation (8) encompasses the fact that the interaction region of the drive is limited to the volume immediately above the electrode array because the field falls off exponentially. From the perspective of scaling, Equation (8) indicates that electrode arrays can be packed in three dimensions with only ~L between successive planes without compromising the twDEP force. Larger separations do not reduce $p_{DAP}$, but they represent less efficient usage of space. Critically, twDEP is non-conservative, enabling it to serve as a foundation for propulsion.

The fact that Equation (8) is negative indicates that the twDEP force in a simple periodic potential will act in the direction opposite the motion of the particle. However, the magnitude and direction of the twDEP force is dependent upon the specific profile of the electric field and the polarizability response function of the material of interest. As discussed below, it is possible to leverage the resonant nature of polarizability functions to provide accelerating forces on passing particles and provide forward thrust on the craft in opposition of drag.

Theory of twDEP in Low-Earth Orbit

In order for twDEP to provide a meaningful amount of net force, there needs to be a non-zero imaginary polarizability. This is the case for polarizable gas molecules such as $O_2$, but only in narrow frequency bands. In Earth's atmosphere, $O_2$ can be used to generate a propulsive force through twDEP. Specifically, $O_2$ strongly absorbs 60 GHz radiation (indicating that $\alpha''$ is large), owing to a rotational resonance of $O_2$ near this frequency. While it is challenging to generate appreciable electrical power at 60 GHz, orbiting spacecraft provide an alternate path to realizing high frequency fields. In low-Earth orbit, spacecraft travel relative to the atmosphere with a velocity ~7.8 km/s. Thus, it is possible to construct a periodic array of electrodes that are energized with DC fields such that passing gas molecules experience an AC field of the right frequency. For example, constructing electrodes that alternate between positive and negative voltages every 130 nm would provide an effective 60 GHz field for passing $O_2$, generating twDEP forces on these $O_2$ molecules. This result flows from the well-known relationship between frequency, wavelength and wave velocity, $f=v/\lambda$. In this case, the quotient (7.8 km/s)/(130 nm) is equal to 60 GHz.

It should be emphasized that the ability to generate a DC field that is experienced by $O_2$ as a microwave AC field is a crucial advantage of this approach and a defining insight that could enable a DAP drive to function with high efficiency. A second enabling advantage of this approach is that, since both drag and DAP-generated thrust scale with local density, the ability of the drive to sustain orbit is insensitive to variations in density with altitude or at a given altitude.

The theoretical discussion above, together with knowledge of atmospheric conditions, allows production of an estimate for $p_{DAP}$. Of particular importance is establishing an estimate for $\alpha''$, or the imaginary polarizability of $O_2$. In fact, this term has been of interest to a wider community because it is responsible for limiting microwave communications and microwave astronomy.

Figure 3:
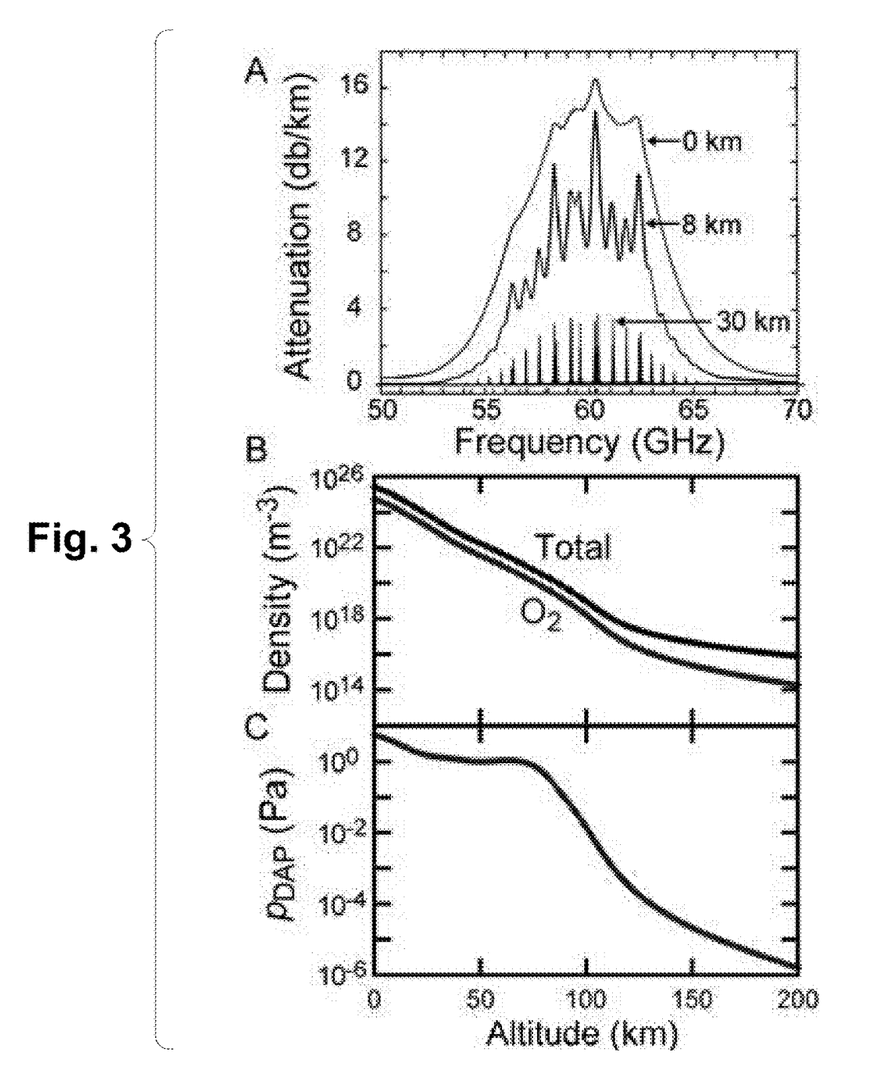
FIG. 3 is a set of plots of DAP-related parameters.

An explanation is provided with reference to FIG. 3. FIG. 3, part A shows the microwave absorption spectrum (attenuation vs. frequency) as it has been determined at various altitudes (0 km, 8 km, and 30 km). These spectra allow computation of the polarizability, on a per atom basis, as a function of altitude. At atmospheric conditions (0 km), one may compute $\alpha''=2\times10^{-42}$ C·m²/V at 60 GHz, which is consistent with other measurements of pure oxygen. However, at higher altitudes the spectra becomes much sharper and the peaks increase substantially due to the absence of particle-particle interactions. As a result, at altitudes above 80 km $\alpha''=4\times10^{-38}$ C·m²/V. This 20,000 fold increase in polarizability comes with a corresponding narrowing of the bandwidth. This information together with the density of oxygen as a function of altitude (FIG. 3, part B) allows us to compute $P_{DAP}$ vs. altitude (FIG. 3, part C), which shows that an appreciable force can be generated and that this force increases significantly at lower altitudes. Here, atmospheric densities are calculated using the known MSIS-E 90 model of Earth's atmosphere, and an assumption of $E_0$~5 MV/cm, which is reasonable for high quality dielectrics. It should be noted, however, that the DAP drive will function with $E_0<5$ MV/cm, albeit requiring larger area to produce the same thrust.

Example Implementation of an Orbital DEP Drive

Figure 4:
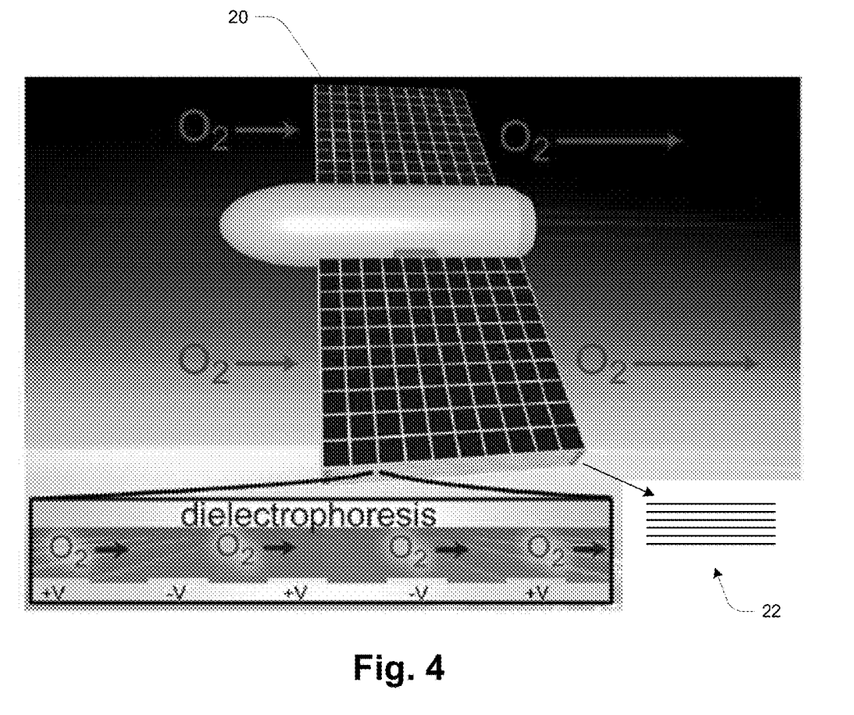
FIG. 4 is a schematic diagram of an orbiting vehicle employing DAP.

FIG. 4 is a schematic depiction of a dielectrophoresis of atmosphere propellant-free (DAP) drive. A satellite is depicted in ultra-low earth orbit wherein the oncoming gas passes through an array of electrodes residing beneath upward-facing solar panels 20. As shown at lower right, the electrodes are arranged on surfaces of one or more thin, spaced-apart planar substrates 22. The inset at lower left schematically shows gas molecules ($O_2$) experiencing dielectrophoresis as they pass across an array of electrodes. Additional details are provided below. During this process, passing $O_2$ molecules are accelerated in a process known as traveling-wave dielectrophoresis (twDEP). Collectively, the DAP drive can overcome drag and sustain orbit effectively indefinitely at altitudes above 125 km.

Figure 5:
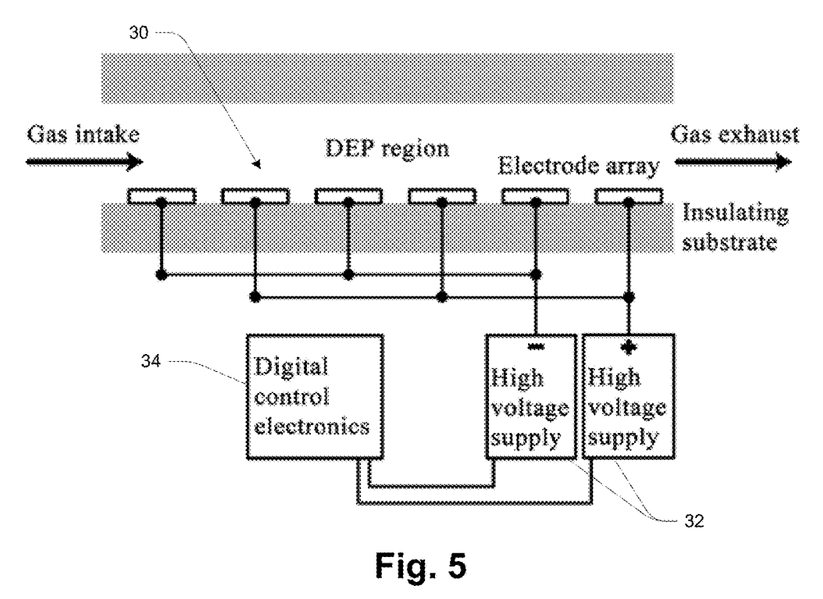
FIG. 5 is a schematic diagram of a DAP drive.

FIG. 5 is a block diagram showing structure and operation of the orbital DAP drive. Gas enters and passes over an array of electrodes 30. Electrodes 30 are energized with an alternating series of opposite-polarity DC voltages produced by high voltage power supplies 32 under control of digital control electronics 34. The gas exits the DAP drive at a higher velocity than it entered, generating thrust. While this simplified depiction shows only six electrodes, a more typical realization would include hundreds of thousands of electrodes. Optimization may include layering multiple flow channels on top of each other.

Figure 6:
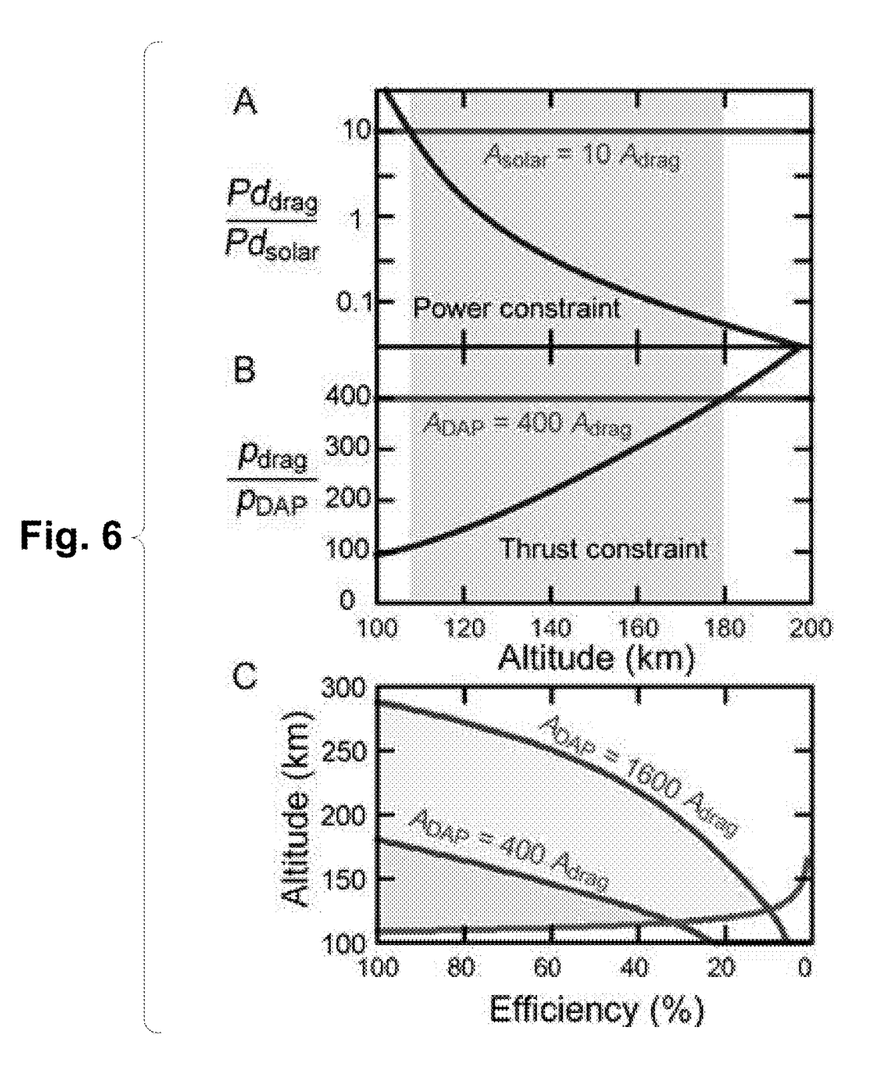
FIG. 6 is a set of plots of certain design considerations for a satellite using a DAP drive.

With reference to FIG. 6, certain operational considerations must be satisfied in order for a DAP drive to be used for space propulsion. For example, in order for a DAP drive to sustain an orbit, sufficient energy must be provided (e.g., by solar panels) to power the DAP drive to replenish the energy lost to drag. In particular, the rate of energy lost to drag $P_{drag}$ is proportional to the aerodynamic cross sectional area $A_{drag}$, while the power generated from solar panels $P_{solar}$ is proportional to the area of the solar panels $A_{solar}$. As such, this design constraint may be clearly illuminated by plotting the ratio of the areal density of power loss from drag $Pd_{drag}=P_{drag}/A_{drag}$ to the areal density of power gain from solar panels $Pd_{solar}=P_{solar}/A_{solar}$ (FIG. 6, part A). For example, if one choses $A_{solar}=10\ A_{drag}$, enough power can in principle be collected to sustain orbit at altitudes above ~110 km. This analysis assumed a drag coefficient of 0.1, an average power collected by the orbitally averaged solar panels of 200 W/m² and atmospheric densities based upon the MSIS-E 90 model. Sustaining orbit requires that the DAP drive provide sufficient thrust to overcome drag. As the force provided by a DAP drive is proportional to the drive area ADAP, this condition may be quantified by comparing the ratio of drag pressure $p_{drag}$ to the drive pressure $p_{DAP}$ produced by a DAP drive (FIG. 6, part B). Interestingly, because the atmospheric fraction of $O_2$ increases as altitude decreases, this constraint is more easily met at lower altitudes. For example, if $A_{DAP}=400\,A_{drag}$, this constraint is met at altitudes below ~180 km. It is also worth mentioning that orbital velocity depends on altitude, but there is only a 0.1% change in the altitude range 120 to 300 km for a spacecraft in a circular orbit. In addition to this being a small effect, it may be that DAP drives should be tuned to substantially lower frequencies than the resonance, thus such a small shift is not likely to limit the operational range.

Based on the above analysis, it is energetically feasible to sustain orbit at 125 km using a DAP drive. Meeting the power and thrust conditions depends on the choice of $A_{drag}$, $A_{solar}$, and $A_{DAP}$. In general $A_{solar}>A_{drag}$ so a choice of $A_{solar}/A_{drag}=10$ (for example) is reasonable. $A_{DAP}/A_{drag}=400$ is based on the assumption that DAP drive electrode arrays are stacked in sheets to increase effective area (in this case, 40 sheets, and assuming $A_{DAP}=A_{solar}$, i.e., the DAP drive is mounted beneath the solar panels). For example, each DAP drive electrode array can be mounted on an ultra-light, high dielectric strength laminate such as "CP1," a thin polyimide substrate that has been tested by NASA as a solar sail candidate material. Thicknesses can be in the range of 2 μm to 1 mm. With this material and a 100 μm spacing between each sheet, a 40 sheet DAP drive would only be 4 mm thick. Total drive thickness in the range between 10 μm and 1 m would be appropriate. Alternatively, the DAP drive can be based upon diamond-coated silicon wafers that are 300 μm in thickness. Such materials would be extremely mechanically and electrically robust and still result in a drive that is less than 2 cm thick.

Efficiency is an important consideration as no propulsion system can convert electrical energy perfectly to kinetic energy. The traces in FIG. 6, part C denote how the operational range of the DAP drive would change as the drive efficiency is lowered from 100%. In particular, the drive discussed above would still be able to sustain orbit at 125 km at 40% efficiency. In order to accommodate lower efficiency, more drive area is required. For instance, quadrupling the drive area (by increasing the number of sheets in the drive by a factor of 4), would allow it to function below 10% efficiency. Even lower efficiencies could be tolerated by increasing the solar panel area and number of sheets in the drive.

Another design consideration is the spacing between electrodes. While a 130 nm spacing allows for an effective 60 GHz field to be applied to gas molecules, this may not be the ideal configuration. For example, due to the underdamped nature of the oscillating dipole, electrodes with periodicity much larger than 130 nm are likely to produce the strongest propulsive force.

Figure 7:
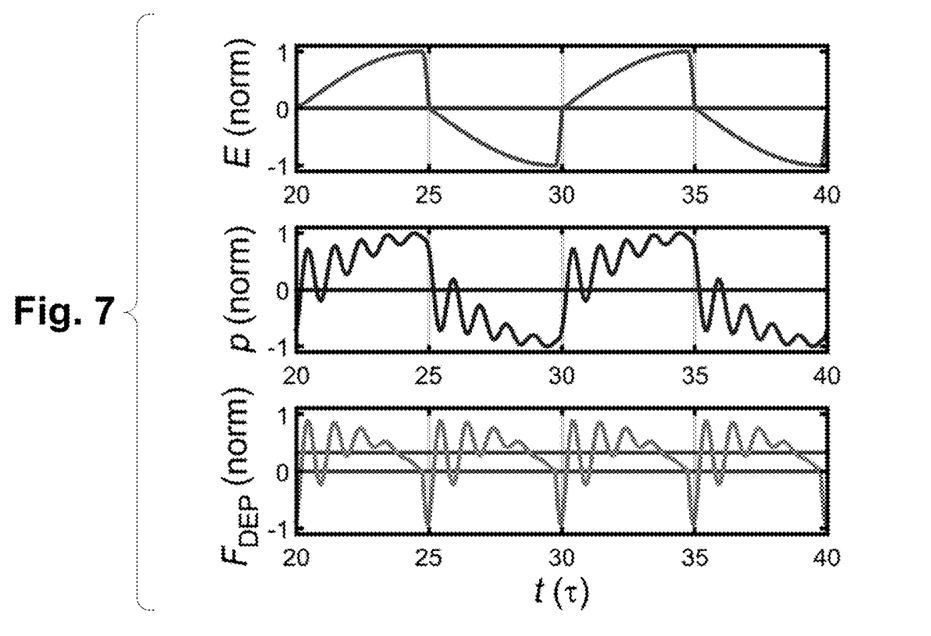
FIG. 7 is a set of plots of values for a gas molecule moving through an asymmetric periodic electric field.

FIG. 7 shows a calculated DEP force on a single gas molecule passing through a set of electrodes with a periodicity equal to ~600 nm. The uppermost plot shows E as a function of time t. The middle plot shows the dipole moment p, which oscillates because it is underdamped. The bottommost plot shows the dielectrophoretic force FDEP, both instantaneous and net. Because the net is positive, it accelerates the molecule in a positive direction. Due to the anisotropic nature of the electric field, the average force is positive despite an overall oscillatory behavior. Based on this analysis, it may be that electrode spacings between 10 nm and 100 μm could potentially be useful for a DAP drive. In order to achieve the desired electric fields, voltages between ±1 V and ±10 kV may be employed.

II. Terrestrial Application: twDEP through Adiabatic Compression of Ambient Gas

While the above describes the use of twDEP for generating thrust in an orbiting vehicle, DEP of gases may be applicable in a broader array of applications. Thus, it is important to understand the relationship between gas dynamics and DEP in a more general setting. For example, it is believed that the local density of any gas can be increased by approximately one part in $10^4$ through the application of a high intensity electric field. While this phenomenon follows directly from electrostatic and thermodynamic arguments, it has not been observed, perhaps because it is challenging to directly observe a change of this order in the density of gas. However, exploring the forces resulting from moving gas with electric fields provides both a unique look at the fundamental process of DEP of gas and a new category of propulsion systems that are applicable in a wide array of environments.

While a local increase in gas density is not itself useful for propulsion due to the conservative nature of DEP, the principles of twDEP can be used to turn this increased density into a propulsive force. Such a scheme is referred to as traveling-wave dielectrophoresis (twDEP) of gas through adiabatic compression, and is described with reference to the schematic illustration of FIG. 8.

Figure 8:
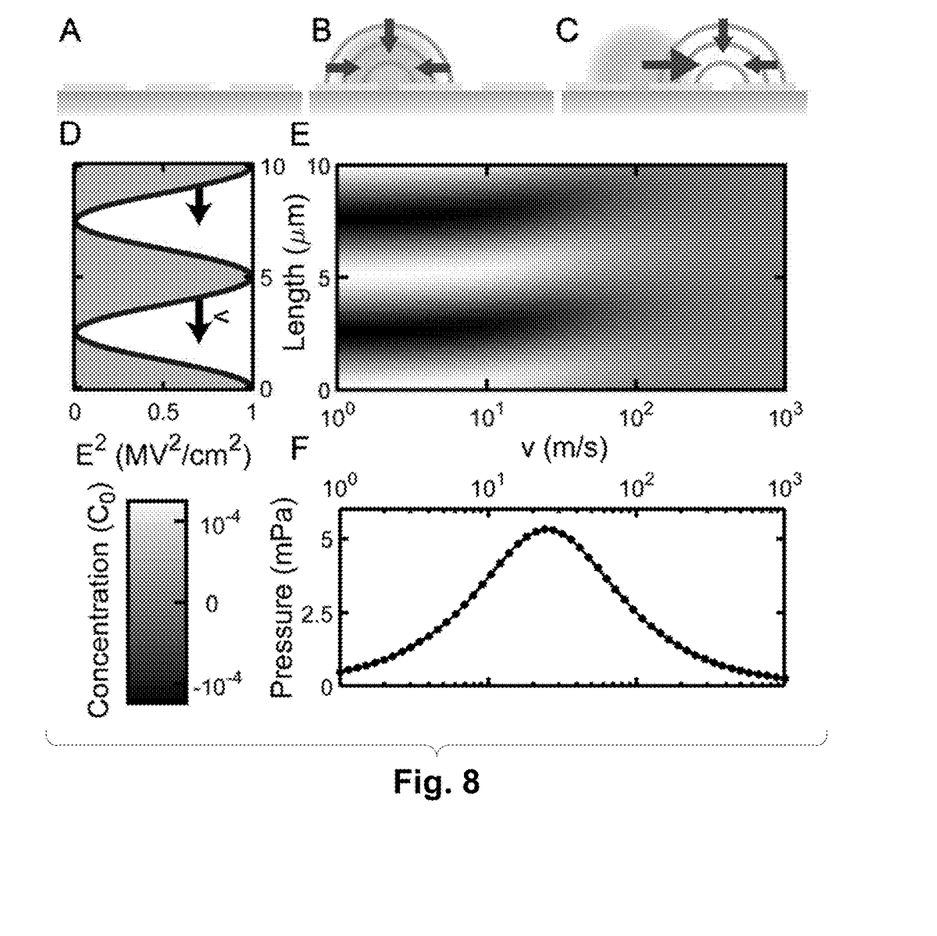
FIG. 8 is a set of diagrams depicting aspects of twDEP of gas through adiabatic compression.

FIG. 8 part (A) shows an initial condition in which a set of electrodes are not energized. Part (B) shows that two electrodes are then energized, leading to a local concentration of gas. Part (C) shows that the original two are switched off and neighboring electrodes are immediately switched on, leading to an unbalanced force in the plane of the electrodes. This unbalanced force provides net thrust to the gas.

Part (D) of FIG. 8 depicts the sinusoidal electric field profile moving with velocity v. Part (E) shows intensity and phase lag of the concentration of the gas, and part (F) shows net twDEP force normalized by electrode area, providing a measure of the pressure that can be exerted.

Simulation may be used to estimate the magnitude of twDEP of ambient gases. For example, a solution can be calculated for a Smoluchowski equation governing the motion of gas particles in the presence of a sinusoidal electric field that is traveling with a velocity v in a repeating 10 μm wide region (FIG. 8 part D). This geometry provides an electric field with magnitude ~$10^8$ V/m. Simulation can reveal that excess concentration (relative to the ambient concentration) is positive in regions of high field and negative in regions of low field with a magnitude $>10^{-4}$ (FIG. 8 part E). While the excess concentration remains in phase with the driving field when v<10 m/s, the concentration lags behind the applied field as v increases. It is this phase lag which enables twDEP. In the other extreme, if v>100 m/s, the gas cannot react fast enough to follow the field and, as a result, the change in concentration becomes negligible. Thus, the total force (per unit area of electrodes) exhibits a peak at v~24 m/s, denoting the location at which twDEP yields the maximum propulsive pressure ~5.3 mPa. These calculations demonstrate that, when driven with appropriate voltages, microscopic electrodes can be used to generate appreciable forces through twDEP of air.

Figure 9:
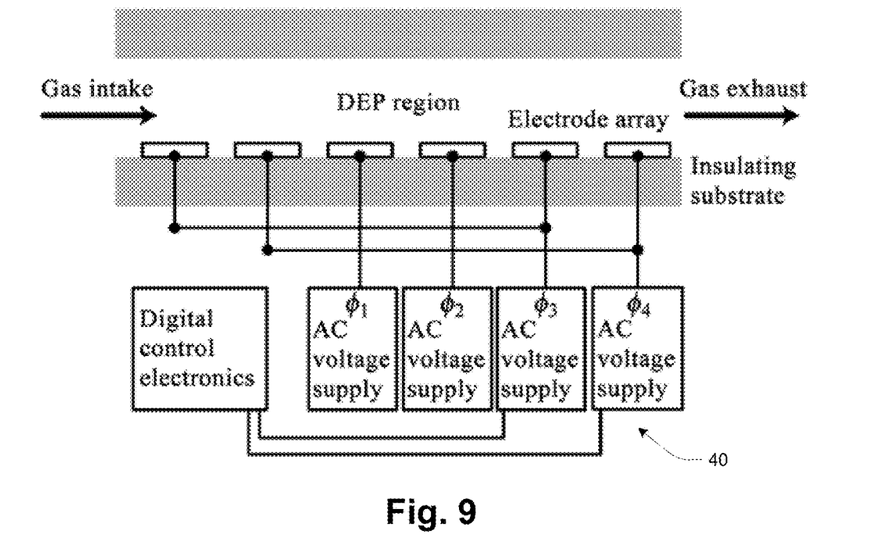
FIG. 9 is a block diagram showing structure and operation of the atmospheric DAP drive.

FIG. 9 is a block diagram showing structure and operation of the atmospheric DAP drive as outlined above. Architecturally, the principle difference between this and the orbital DAP drive is the use of three or more phase-offset AC voltage supplies 40 driving alternating sets of electrodes. In the illustrated example, four supplies of respective phases $\Phi_1$–$\Phi_4$ (e.g., 0, 90, 180 and 270 degrees) are used to drive every fourth electrode in the array. Gas is pulled into the dielectrophoresis (DEP) region at an intake side and pushed out at an exhaust side, generating thrust.

Figure 10:
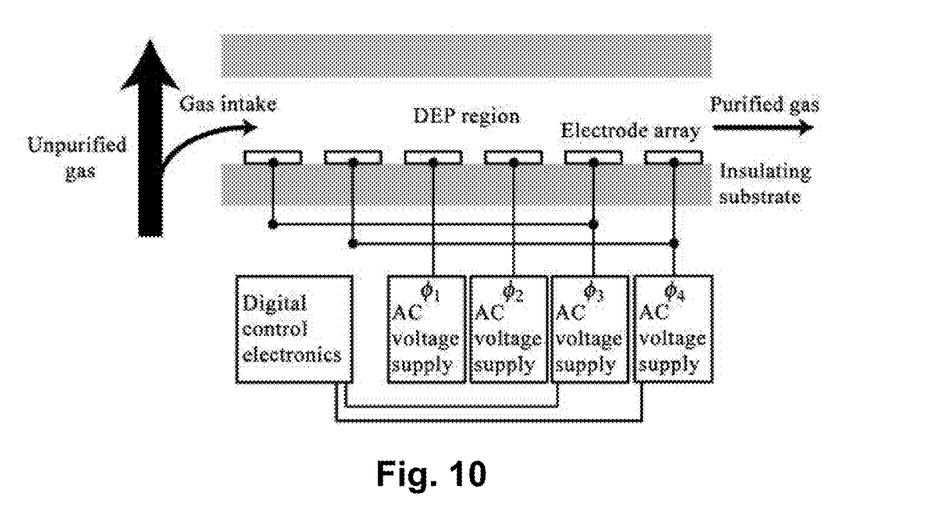
FIG. 10 is a schematic block diagram of an application of DAP to gas purification.

FIG. 10 is a schematic block diagram of an application of DAP to gas purification. A mixture of gases ("unpurified")

flows past the intake, and a desired one of the gases is preferentially pulled into the DEP region. The outlet stream is purified relative to the inlet stream.

The following are certain specific aspects generally applicable to both the orbiting and terrestrial approaches described herein:
1) Electrodes are preferably supported on thin, insulating materials with high dielectric breakdown strength, e.g. high performance plastics.
2) Electrodes are preferably lightweight, thin, and highly conductive, e.g. silver, aluminum, or titanium.
3) Electrodes are preferably organized in large interdigitated arrays.
4) Multiple electrode arrays may be used, and may be stacked or otherwise arranged in one or two dimensions.

The following are certain specific aspects for the orbiting application in particular:
1) Spacing of electrodes is preferably such that, even though the electrodes are energized with a DC field, passing $O_2$ experiences an AC field at or near a resonance frequency
2) It may commonly be preferable to employ solar cells to provide electrical power, but other power sources may be used in alternative embodiments
3) DEP interaction region should allow passing gas molecules a trajectory that is not obstructed by solid objects
4) The DAP drive should be aligned in the direction of maximum gas inflow on the vehicle
5) DAP drive elements should be arranged symmetrically on the satellite to allow for torques to be balanced
6) DAP drives should be positioned on a surface such as a solar panel to permit a sufficiently large surface area to be used to generate adequate thrust
7) While the orbiting application is described as using a DC field, it is possible to modulate the DC field using a lower than resonance AC field to some advantage While various embodiments of the invention have been particularly shown and described, it will be understood by those skilled in the art that various changes in form and details may be made therein without departing from the scope of the invention as defined by the appended claims.

What is claimed is:

1. A traveling-wave dielectrophoresis propulsion system for an orbiting vehicle, comprising:
a set of surfaces over which a gas passes during orbital flight of the vehicle;
a plurality of electrodes on the surfaces, the electrodes configured to create an electric field having a predetermined spatial field pattern in response to field signals applied thereto, the spatial field pattern being experienced by passing molecules of the gas as an oscillating field having a frequency on the order of a polarization-resonance frequency of the molecules to impart a propulsive traveling-wave dielectrophoretic force to the passing molecules, the electrodes extending over sufficient area to impart sufficient traveling-wave dielectrophoretic force to the gas to overcome aerodynamic drag and thereby sustain orbital flight of the vehicle; and
a power source configured and operative to apply the field signals to the electrodes, the power source providing sufficient power to overcome power lost to aerodynamic drag and thereby sustain orbital flight of the vehicle.

2. A traveling-wave dielectrophoresis propulsion system according to claim 1, wherein each surface is substantially planar and the surfaces are arranged parallel to each other with spacing therebetween.

3. A traveling-wave dielectrophoresis propulsion system according to claim 2, wherein the spacing is on the order of a period of the spatial field pattern.

4. A traveling-wave dielectrophoresis propulsion system according to claim 1, wherein the power source includes one or more arrays of solar cells configured to convert sunlight into electrical power for the field signals.

5. A traveling-wave dielectrophoresis propulsion system according to claim 4, wherein each array of solar cells is disposed on an upper surface of a planar member, and the set of surfaces carrying the electrodes are arranged beneath a lower surface of the planar member.

6. A traveling-wave dielectrophoresis propulsion system according to claim 5, wherein the surfaces are arranged parallel to each other with spacing therebetween.

7. A traveling-wave dielectrophoresis propulsion system according to claim 4, wherein a ratio of solar-cell area to drag area of the vehicle is 10 or greater.

8. A traveling-wave dielectrophoresis propulsion system according to claim 1, wherein a ratio of drive area of the surfaces to a drag area of the vehicle is 400 or greater.

9. A traveling-wave dielectrophoresis propulsion system according to claim 1, wherein the surfaces are surfaces of layers of a lightweight polyimide substrate having a thickness in the range of 2 μm to 1 mm.

10. A traveling-wave dielectrophoresis propulsion system according to claim 1, wherein the surfaces are surfaces of respective diamond-coated silicon wafers having a thickness of about 300 μm.

* * * * *